(12) United States Patent
Takemura et al.

(10) Patent No.: US 10,509,973 B2
(45) Date of Patent: Dec. 17, 2019

(54) ONBOARD ENVIRONMENT RECOGNITION DEVICE

(71) Applicant: HITACHI AUTOMOTIVE SYSTEMS, LTD., Ibaraki (JP)

(72) Inventors: Masayuki Takemura, Tokyo (JP); Takeshi Nagasaki, Hitachinaka (JP); Felipe Gomezcaballero, Tokyo (JP); Takeshi Shima, Tokyo (JP)

(73) Assignee: HITACHI AUTOMOTIVE SYTEMS, LTD., Ibaraki (JP)

( * ) Notice: Subject to any disclaimer, the term of this patent is extended or adjusted under 35 U.S.C. 154(b) by 65 days.

(21) Appl. No.: 15/574,374

(22) PCT Filed: Jul. 1, 2016

(86) PCT No.: PCT/JP2016/069579
§ 371 (c)(1),
(2) Date: Nov. 15, 2017

(87) PCT Pub. No.: WO2017/014023
PCT Pub. Date: Jan. 26, 2017

(65) Prior Publication Data
US 2018/0137375 A1    May 17, 2018

(30) Foreign Application Priority Data
Jul. 17, 2015 (JP) .................. 2015-143192

(51) Int. Cl.
*H04N 13/254* (2018.01)
*B60Q 1/04* (2006.01)
(Continued)

(52) U.S. Cl.
CPC ........... *G06K 9/00805* (2013.01); *B60Q 1/04* (2013.01); *B60R 11/04* (2013.01); *H04N 5/2351* (2013.01);
(Continued)

(58) Field of Classification Search
CPC .. G06K 9/00805; G06K 9/00825; G08G 1/16; H04N 5/2351; H04N 5/2353
See application file for complete search history.

(56) References Cited

U.S. PATENT DOCUMENTS

| | | | |
|---|---|---|---|
| 2007/0071343 A1* | 3/2007 | Zipnick ..................... | G06T 5/50 382/254 |
| 2007/0153086 A1* | 7/2007 | Usui ....................... | H04N 5/235 348/153 |

(Continued)

FOREIGN PATENT DOCUMENTS

| | | |
|---|---|---|
| JP | 2002-099908 A | 4/2002 |
| JP | 2005-033709 A | 2/2005 |

(Continued)

OTHER PUBLICATIONS

International Search Report for WO 20171014023 A1, dated Sep. 20, 2016.

(Continued)

*Primary Examiner* — Francis Geroleo
*Assistant Examiner* — Christopher Kingsbury Glover
(74) *Attorney, Agent, or Firm* — Volpe and Koenig, P.C.

(57) ABSTRACT

An onboard environment recognition device is obtained with which it is possible to improve recognition performance within the headlight illumination range and outside the headlight illumination range of a vehicle with an onboard camera. This onboard environment recognition device has: an imaging unit 100 for imaging, using a camera installed in the vehicle, at a wider-angle range than the headlight illumination range; an in-illumination/out-of-illumination exposure adjustment unit for setting appropriate exposure conditions separately within the headlight illumination range and outside the headlight illumination range; and a recognition unit 500 for recognizing images on the basis of the acquired images. Therefore, it is possible to maintain (Continued)

high recognition performance in the boundary regions of the headlight illumination range, and outside the range, and the present invention can also be used for wide-angle sensing at night.

8 Claims, 14 Drawing Sheets

(51) Int. Cl.
    *B60R 11/04*    (2006.01)
    *H04N 5/235*    (2006.01)
    *G06K 9/00*     (2006.01)
    *H04N 13/296*   (2018.01)
    *B60R 11/00*    (2006.01)

(52) U.S. Cl.
    CPC ......... *H04N 5/2353* (2013.01); *H04N 13/254* (2018.05); *H04N 13/296* (2018.05); *B60R 2011/004* (2013.01)

(56) References Cited

U.S. PATENT DOCUMENTS

| | | | |
|---|---|---|---|
| 2008/0253758 A1* | 10/2008 | Yap | G03B 7/08 396/234 |
| 2009/0073306 A1* | 3/2009 | Kwon | H04N 5/2352 348/362 |
| 2013/0155200 A1* | 6/2013 | Kakuko | G03B 17/565 348/49 |
| 2014/0232830 A1 | 8/2014 | Ichige | |
| 2014/0286593 A1 | 9/2014 | Numata | |
| 2016/0339959 A1* | 11/2016 | Lee | B62D 15/0265 |

FOREIGN PATENT DOCUMENTS

| | | |
|---|---|---|
| JP | 2005-286656 A | 10/2005 |
| JP | 2007-166443 A | 6/2007 |
| JP | 2008-158674 A | 7/2008 |
| JP | 2013-168738 A | 8/2013 |
| JP | 2014-187610 A | 10/2014 |

OTHER PUBLICATIONS

Japanese Office Action dated Mar. 5, 2019 for the Japanese Patent Application No. 2015-143192.
Extended European Search Report dated Feb. 18, 2019 for the European Patent Application No. 16827587.3.

* cited by examiner

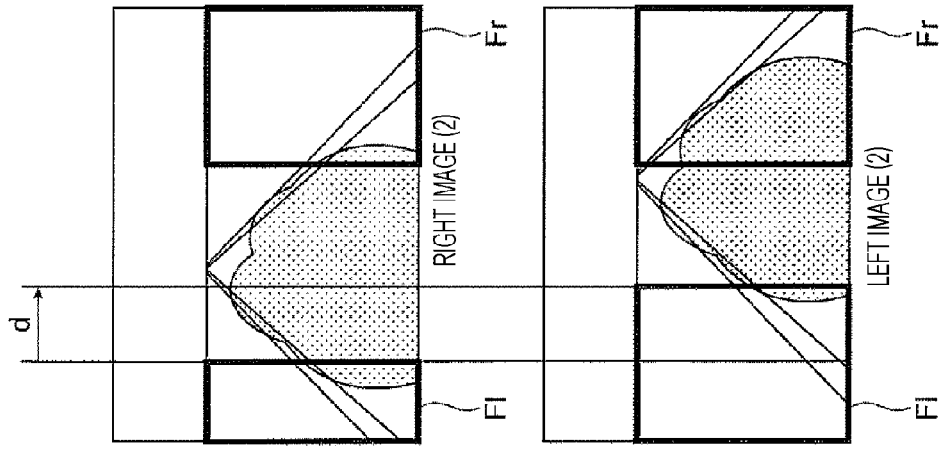
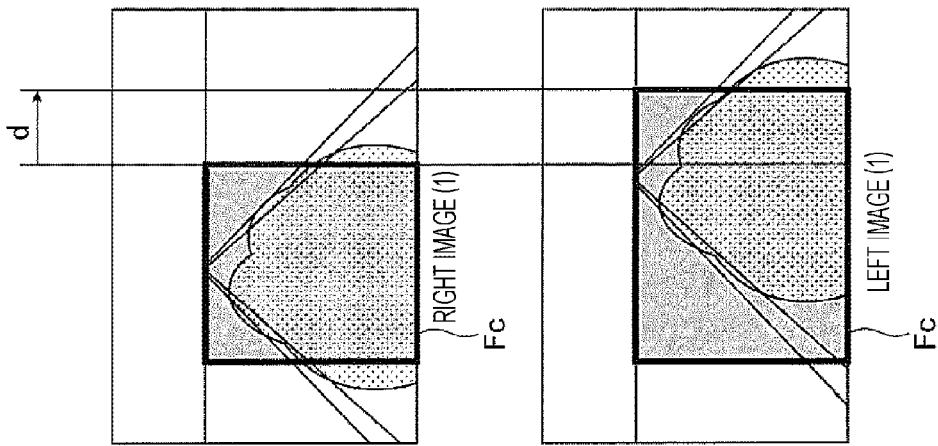
FIG. 10

FIG. 11
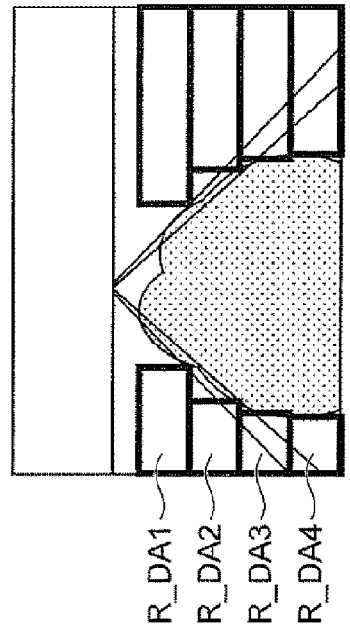
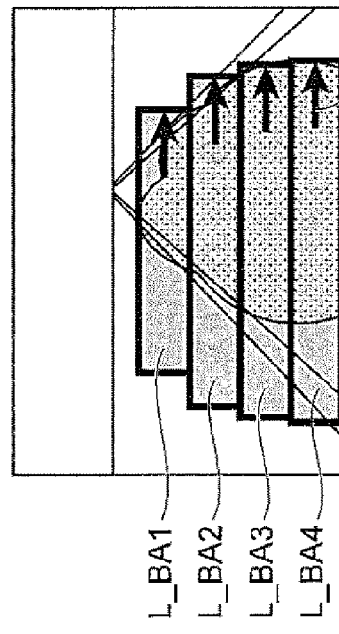
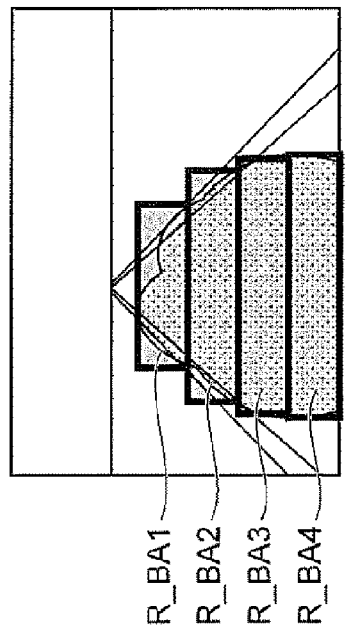

FIG. 13
A) ALTERNATE PROCESSING
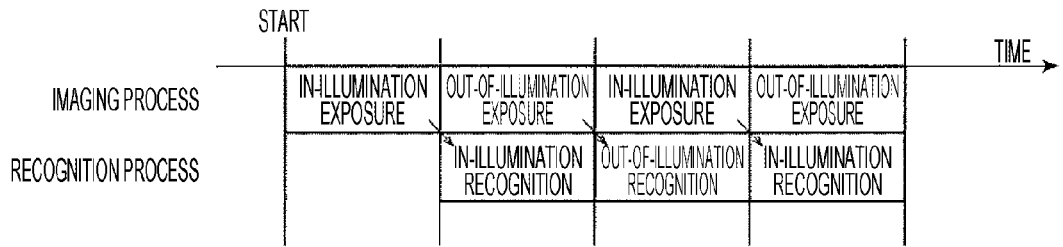
B) UNIFIED PROCESSING
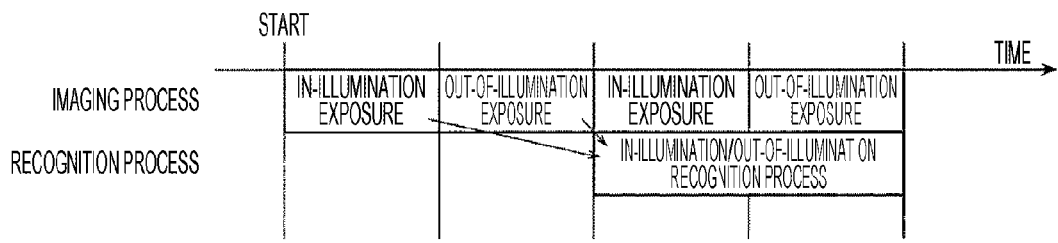

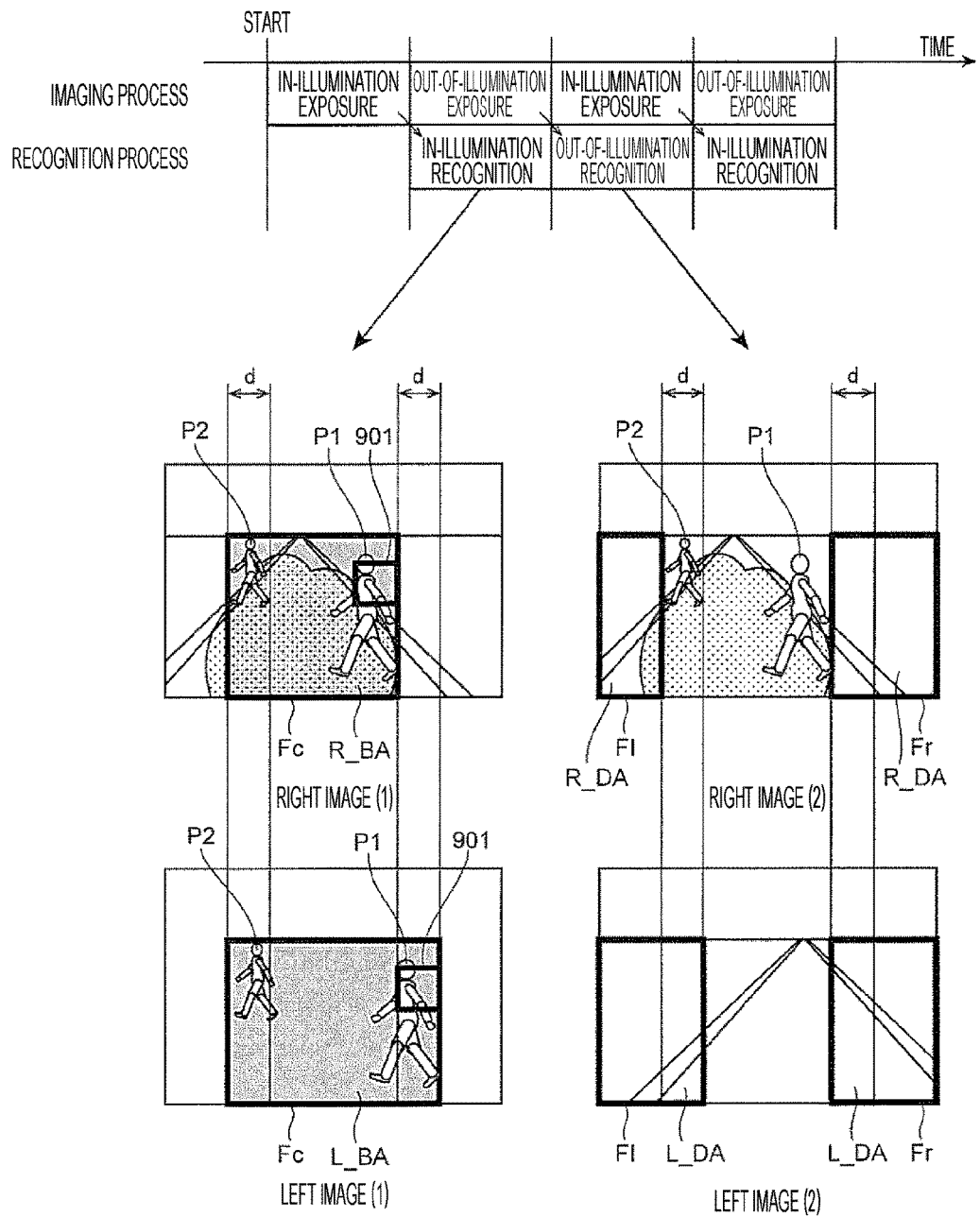

ONBOARD ENVIRONMENT RECOGNITION DEVICE

TECHNICAL FIELD

The present invention relates to an onboard ambient environment recognition device that recognizes an obstacle, a lane, and the like existing around a vehicle using an onboard camera.

BACKGROUND ART

There is an increasing tendency to commercialize applications that recognize the ambient environment of a vehicle using a camera installed in the vehicle. Among them, it is expected to apply such applications for a preventive safety technique that prevents an accident beforehand using a recognized object and for a vehicle control technique aiming at autonomous driving. A recognition technique used for vehicle control needs to have high reliability.

For example, in light source environment in which a bright region and a dark region coexist in a camera viewing angle, such as nighttime and backlight, a dynamic range of a camera is insufficient so that over exposure or under exposure occurs, which may become a factor that causes an object not to be recognizable in an image. PTL 1 discloses a technique aiming at implementing detection of an oncoming car or the like by observing an over exposure region caused by a headlight of the oncoming vehicle and setting an exposure amount appropriate for recognition in the over exposure region on consideration of being a bright region.

CITATION LIST

Patent Literature

PTL 1: Japanese Patent Application Laid-Open No. 2013-168738

SUMMARY OF INVENTION

Technical Problem

A general camera that detects an obstacle ahead of a vehicle has a viewing angle of about 30 degrees to 50 degrees, and there is no big difference between an imaging range and a headlight illumination range of a subject vehicle. Meanwhile, when a wide-angle camera is used for monitoring the front of the subject vehicle, wide-angle sensing is possible in the daytime, but it is difficult to use the camera for sensing in the nighttime because the outside of a headlight illumination range becomes dark although a wide image can be imaged. Similarly to the onboard front camera whose viewing angle is about 40 degrees, when an appropriate exposure condition is set within an image region in the headlight illumination range, an image region outside the headlight illumination range is subject to under exposure due to the shortage of the dynamic range so that it is difficult to detect an obstacle or the like in such a state, which is problematic. That is, there is a problem that recognition at a wide viewing angle is difficult in the nighttime since the headlight illumination range is narrower than the viewing angle of the wide-angle camera.

The present invention has been made in view of the above-described points, and an object thereof is to provide an onboard environment recognition device capable of improving recognition performance within a headlight illumination range of a subject vehicle and outside the headlight illumination range with an onboard camera.

Solution to Problem

An onboard environment recognition device according to the present invention configured to solve the above-described problem is an onboard environment recognition device including: an imaging unit that images front of a subject vehicle using an onboard camera; and a recognition unit that recognizes ambient environment using an imaged image imaged by the imaging unit. The onboard camera is capable of imaging a range which includes a headlight illumination range of the subject vehicle and is wider in a horizontal direction than the headlight illumination range. The imaging unit images the imaged mage by changing an adjustment amount of brightness between an image of an in-illumination region obtained by imaging inside of the headlight illumination range and an image of an out-of-illumination region obtained by imaging outside of the headlight illumination range.

Advantageous Effects of Invention

According to the present invention, it is possible to improve the recognition performance within the headlight illumination range of the subject vehicle and outside the headlight illumination range with the onboard camera. In particular, degradation of sensing recognition performance is suppressed even outside the headlight illumination range by considering exposure adjustment targeting an image region outside the headlight illumination range. In addition, degradation of recognition performance in a boundary region between the inside of the headlight illumination range and the outside of the headlight illumination range is also suppressed. Incidentally, other objects, configurations, and effects will be apparent from the following description of embodiments.

BRIEF DESCRIPTIONS OF THE DRAWINGS

FIG. 10 is a view for describing a configuration of a stereo left/right region setting unit.

FIG. 11 is a view for describing another configuration of the stereo left/right region setting unit.

FIG. 13 is a view illustrating a timing chart of double exposure.

FIG. 15 is a view illustrating another timing chart of the double exposure.

DESCRIPTION OF EMBODIMENTS

Hereinafter, embodiments of the present invention will be described with reference to the drawings.

Figure 1:
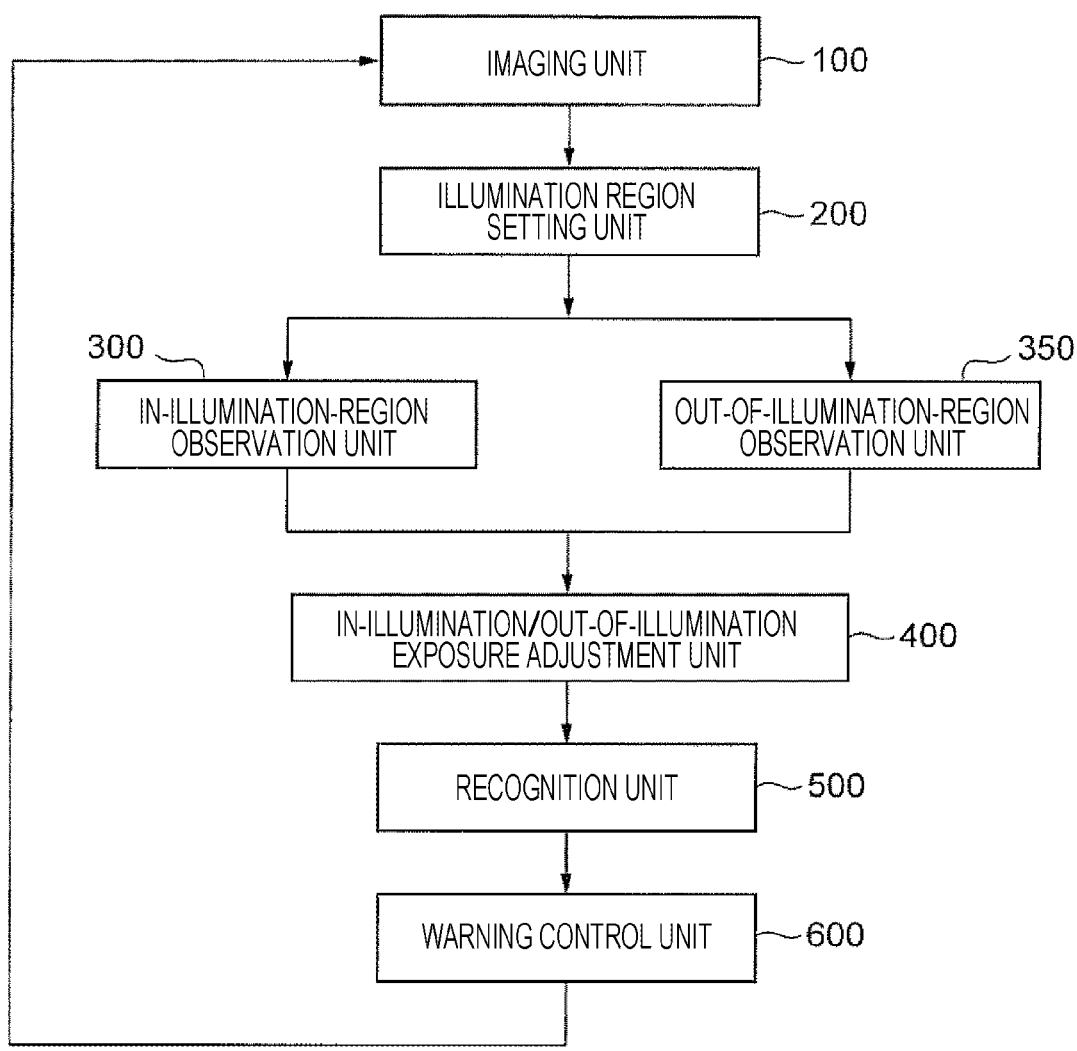
FIG. 1 is a configuration diagram of an onboard environment recognition device.

FIG. 1 is a configuration diagram of an onboard environment recognition device. An onboard environment recognition device according to the present embodiment images ambient environment of a subject vehicle and recognizes the ambient environment such as an obstacle and a lane using an onboard camera mounted on the vehicle, and can execute vehicle control such as warning and emergency braking, for example, when it is determined that a risk of a collision with the obstacle is high. The onboard environment recognition device is configured, for example, using a combination of hardware such as a camera device and software, and includes an imaging unit 100, an illumination region setting unit 200, an in-illumination-region observation unit 300, an out-of-illumination-region observation unit 350, an in-illumination/out-of-illumination exposure adjustment unit 400, a recognition unit 500, and a warning control unit 600 as internal functions thereof as illustrated in FIG. 1.

The imaging unit 100 images the front of the subject vehicle using the onboard camera. The onboard camera uses a wide-angle camera having a wider field angle than a headlight illumination range that can be irradiated by a headlight of the subject vehicle.

Figure 5:
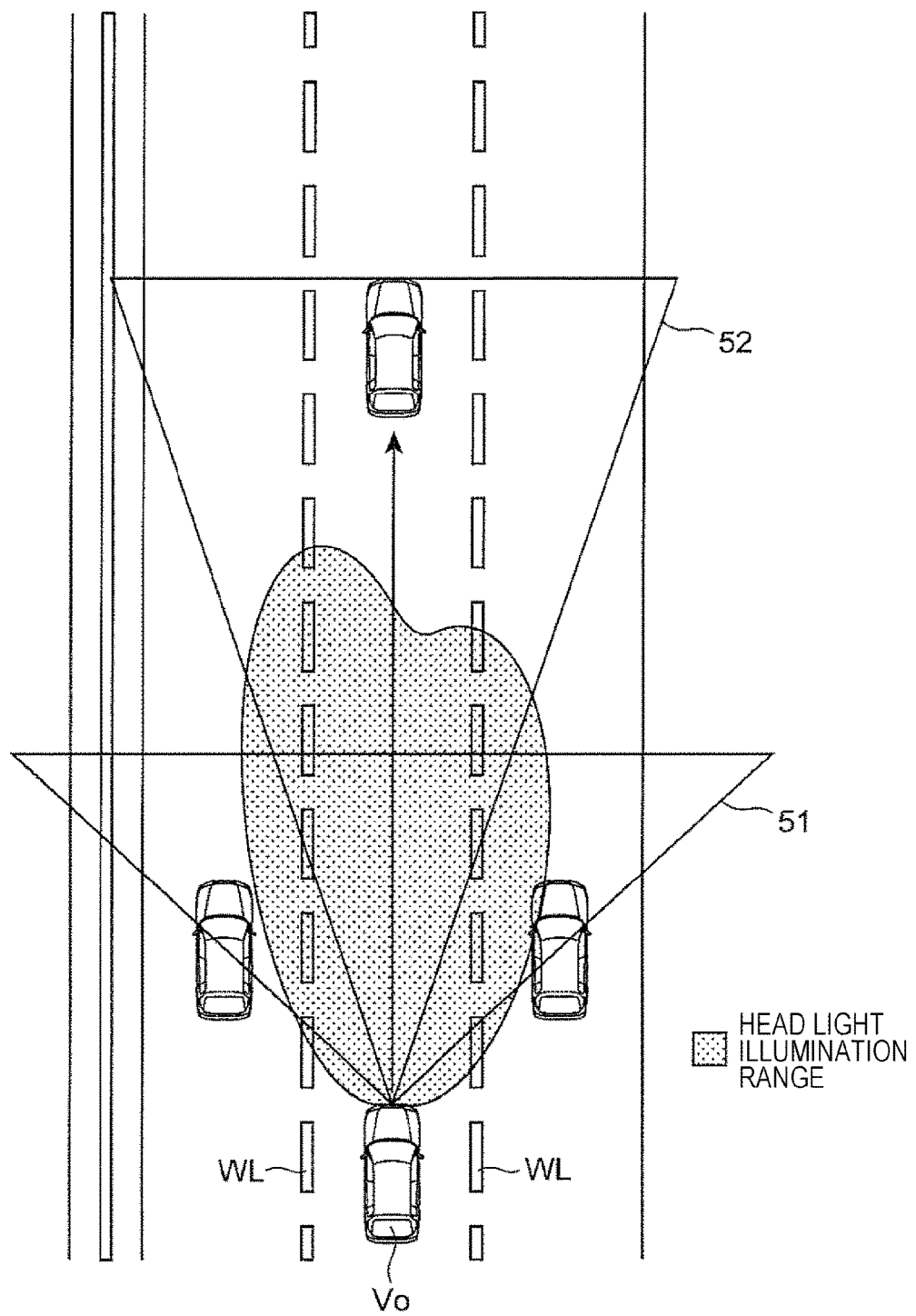
FIG. 5 is a view schematically illustrating an example of a viewing angle of a camera and a headlight illumination range.

FIG. 5 is a view schematically illustrating an example of the viewing angle of the camera and the headlight illumination range. For example, a general onboard camera of the related art that detects an obstacle ahead of a subject vehicle Vo is configured for far narrow-angle monitoring, and has a field angle (viewing angle) 52 of about 30 to 50 degrees, which is similar to a headlight illumination range of the subject vehicle Vo without a big difference. On the other hand, the onboard camera used in the present embodiment is a so-called wide-angle camera whose field angle for near wide-angle monitoring is about 120 degrees, has a field angle 51 wider than the headlight illumination range of the subject vehicle Vo, and can wide-angle sensing in the daytime. In the present embodiment, when the onboard camera is a camera having a wider field angle than the headlight illumination range of the subject vehicle including a fisheye camera, it is possible to expect an effect for improvement of the recognition performance under environment where surroundings is dark such as in the nighttime. The onboard camera of the present embodiment is preferably the wide-angle camera, and may be either a monocular camera or a stereo camera.

Returning to the description of FIG. 1, a process of setting an illumination region occupied by the headlight illumination range of the subject vehicle inside the imaged image is performed in the illumination region setting unit 200. The illumination region setting unit 200 may store headlight illumination ranges of a high beam and a low beam according to exposure control of the headlight, in advance, as information, and set the illumination region based on a headlight lighting state of the subject vehicle obtained by CAN communication. In addition, the illumination region may be estimated by image recognition.

The illumination region setting unit 200 sets an in-illumination-region luminance observation region (exposure frame) in the illumination region to observe luminance on an image within the illumination region, and sets an out-of-illumination-region luminance observation region (exposure frame) to observe luminance on an image out of the illumination region which is outside the headlight illumination range. The in-illumination-region observation unit 300 calculates a luminance average on the image in in-illumination-region luminance observation region set by the illumination region setting unit 200. Similarly, the out-of-illumination-region observation unit 350 calculates a luminance average on the image in the out-of-illumination-region luminance observation region set by the illumination region setting unit 200.

The in-illumination/out-of-illumination exposure adjustment unit 400 executes exposure control by utilizing a luminance change on the image observed by the in-illumination-region observation unit 300 and the out-of-illumination-region observation unit 350 described above. The in-illumination/out-of-illumination exposure adjustment unit 400 sets an exposure condition that enables acquisition of an image suitable for a process of imaging a bright region within the headlight illumination range irradiated by the headlight based on a result of the in-illumination-region observation unit 300. Then, the exposure condition of the imaged image is changed while performing feedback control such that the luminance average in the illumination region falls within a specific luminance range and a severe luminance change does not occur within one frm.

In addition, the in-illumination/out-of-illumination exposure adjustment unit 400 sets an exposure condition that enables acquisition of an image suitable for a process of imaging a dark region outside the headlight illumination range based on a result of the out-of-illumination-region observation unit 350. Then, the exposure condition of the imaged image is changed while performing feedback control such that the luminance average outside the illumination region falls within a specific luminance range and a severe luminance change does not occur within one frm. When exposure condition is changed, an adjustment amount (a gain or an exposure time) of brightness is changed.

Then, an image of a bright region and an image of a dark region are acquired based on the changed exposure conditions. When the image of the dark region is acquired, an image which enables easy recognition of a region having low illuminance is acquired by increasing a shutter time, raising a gain in a dark state to be high, or using an integral image of a high-speed camera so as to prevent under exposure of the image.

Figure 7:
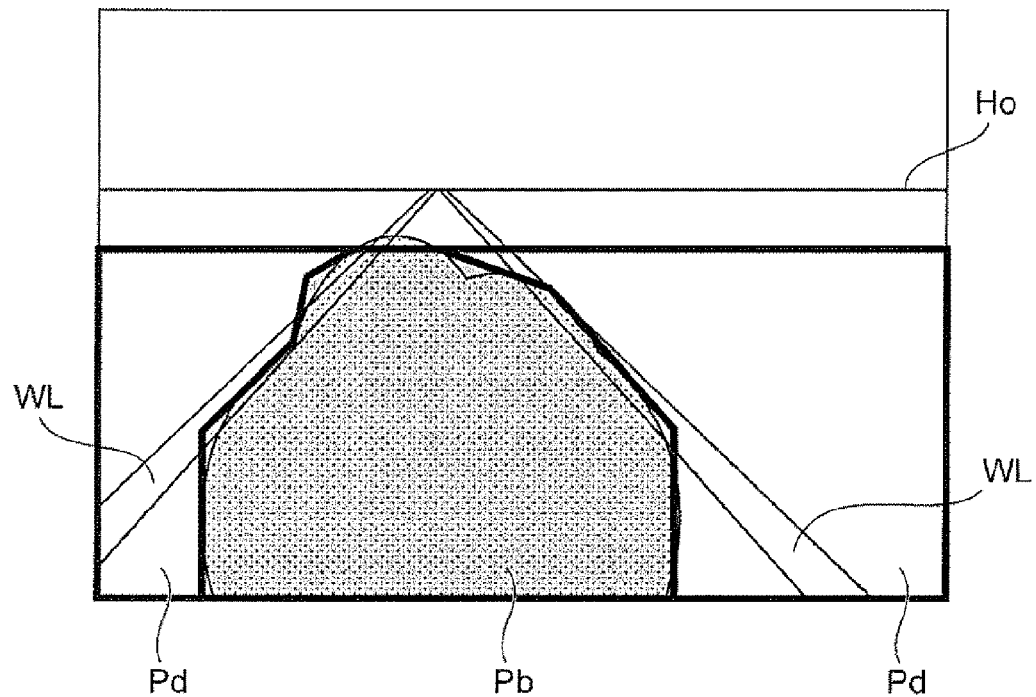
FIG. 7 is a view for describing a use image inside and outside the illumination region.

The recognition unit 500 executes a recognition process by utilizing image of the bright region (bright region image Pb) inside a headlight light distribution pattern to recognize an object in the headlight illumination range and utilizing the image of the dark region (dark region image Pd) outside the headlight light distribution pattern to recognize an object outside the headlight illumination range based on information on a light distribution pattern since the inside of the headlight illumination range and the outside of the headlight illumination range are known as illustrated in FIG. 7. It is possible to implement suitable recognition even outside the illumination region by selecting a suitable image according to the brightness on the image and performing image recognition. For example, in pedestrian detection and vehicle detection, it is also possible to detect an obstacle, a lane, and the like existing at a wide-angle position of the camera even in the nighttime by preparing the image suitable for recognition even in a boundary region between the out-of-illumination region and the in-illumination region.

The warning control unit 600 predicts influence on the subject vehicle using a result recognized by the recognition unit 500 and performs warning or vehicle control, for example, lane departure prevention and collision prevention, and the like.

Figure 2:
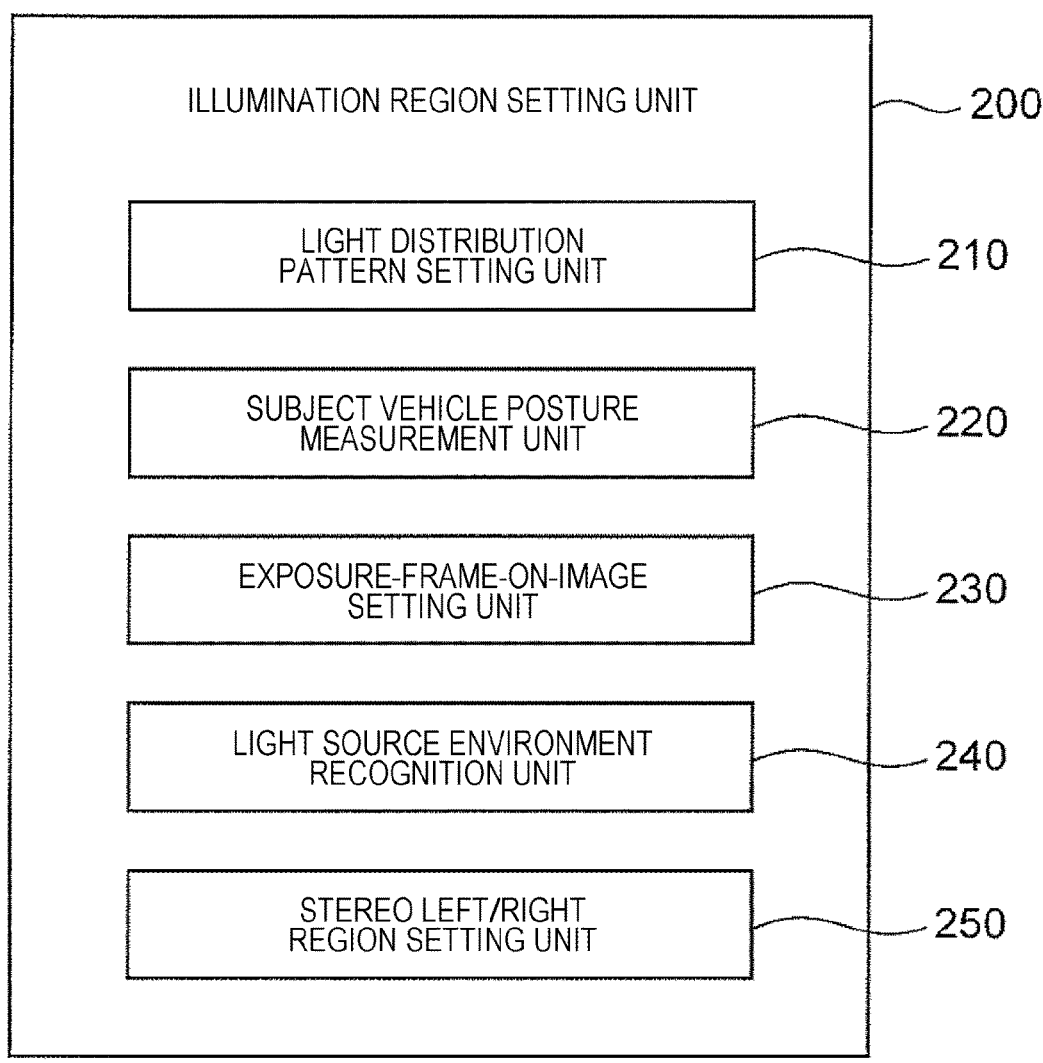
FIG. 2 is a diagram illustrating a configuration of an illumination region setting unit.

Next, a specific configuration example of the illumination region setting unit 200 illustrated in FIG. 1 will be described. FIG. 2 is a diagram for describing a configuration example of the illumination region setting unit. As illustrated in FIG. 2, the illumination region setting unit 200 includes a light distribution pattern setting unit 210, a subject vehicle posture measurement unit 220, an exposure-frame-on-image setting unit 230, a light source environment recognition unit 240, and a stereo left/right region setting unit 250.

The light distribution pattern setting unit 210 sets the light distribution pattern of the subject vehicle. Regarding brightness of ambient environment, first, determination on brightness of traveling environment is performed using ON and OFF states of the headlight that can be grasped by the CAN communication and brightness of ambient environment that can be obtained by the camera. The it is determined whether it is daytime or nighttime and whether it is a bright state due to a streetlight or a dark state where there is no light source around the vehicle even in the nighttime. Accordingly, the brightness of the traveling environment of the subject vehicle is grasped. As an illumination state of the headlight of the subject vehicle, it is possible to grasp not only the ON and OFF states but also switching between High and Low states through the CAN communication. However, a fine illumination angle or the like of the headlight is changed depending on an inclination of the subject vehicle and an inclination of a traveling road.

Next, the subject vehicle posture measurement unit 220 measures changes of postures of the subject vehicle and external environment in real time. The postures of the subject vehicle and the external environment are estimated during the traveling of the subject vehicle using image information on a lane WL and a tail lamp of a preceding vehicle and information on a disparity image of a road surface, obtained from the ambient environment, and an edge portion extending vertically upward of a three-dimensional object when the onboard camera of the subject vehicle is the stereo camera. The estimated posture information may be used as correction information of the headlight illumination range. However, there is also a case where the fine angle can be manually adjusted depending on vehicles. Assuming such a case, a rough headlight illumination range may be estimated by utilizing the setting of the exposure frame on the image even in a state where only the information on the ON, OFF, High, and Low states of the headlight can be obtained through the CAN.

Figure 6:
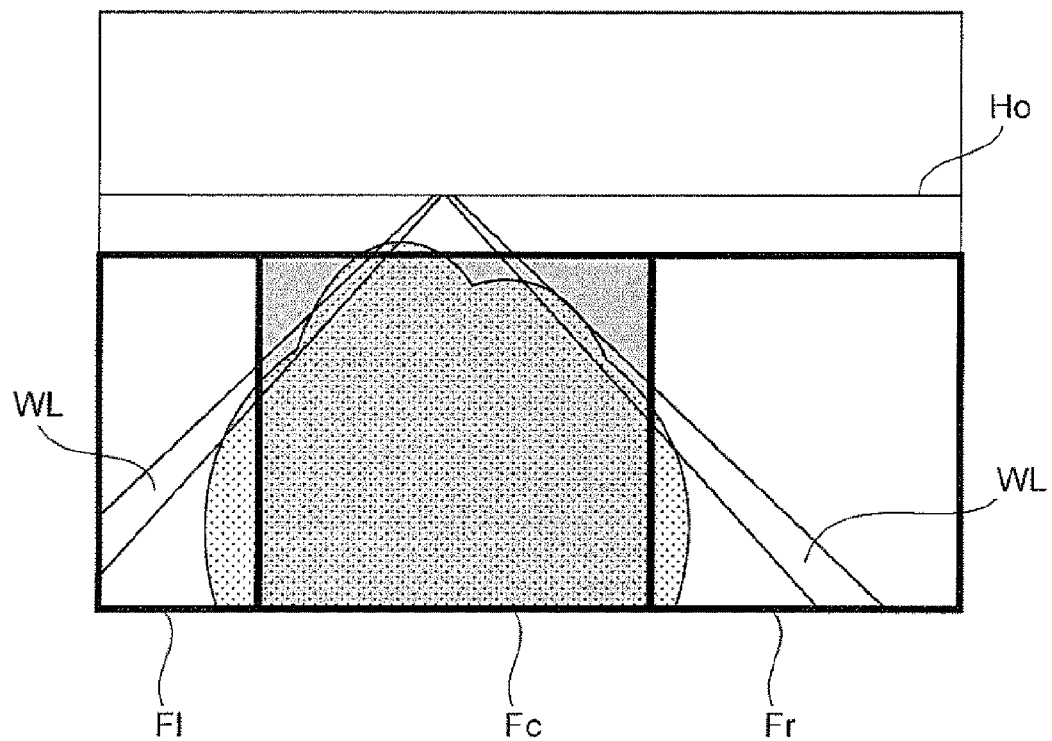
FIG. 6 is a view illustrating an example of setting of an exposure frame inside and outside an illumination region.

The exposure-frame-on-image setting unit 230 divides the in-illumination region and the out-of-illumination region as illustrated in FIG. 6 based on light distribution information obtained by the light distribution pattern setting unit 210 and light distribution information estimated using information obtained by estimating the posture of the vehicle in the subject vehicle posture measurement unit 220, and sets exposure frames Fc, Fl, and Fr to acquire image luminance information for setting of exposure conditions. FIG. 6 is a view illustrating an example of setting of the exposure frame inside and outside the illumination region. FIG. 6 illustrates an image obtained by imaging the front of the vehicle irradiated with the headlight and the exposure frames Fc, Fl, and Fr.

In the image acquired by the exposure frame Fc, the headlight of the subject vehicle is a main light source. Therefore, a luminance average of the exposure frame Fc may be calculated and transferred to the in-illumination/out-of-illumination exposure adjustment unit 400 as luminance information in the in-illumination-region observation unit 300 of FIG. 1. Since it is obvious that the headlight of the subject vehicle serves as the main light source in the nighttime, the exposure condition is adjusted in the in-illumination/out-of-illumination exposure adjustment unit 400 as a design in which the setting of the exposure condition using the luminance information is also gradually changed.

A luminance average of the left and right exposure frames Fl and Fr, positioned on sides of the exposure frame Fc, in a luminance observation region for the out-of-illumination range may be calculated, or luminance averages thereof may be calculated respectively such that the left and right exposure frames can correspond to a difference in external light source environment from ambient environment different between the left and right. These luminance averages are calculated by the out-of-illumination-region observation unit 350. The luminance averages in the exposure frames Fl and Fr are used to set the exposure condition such that an image in a region darker than the in-illumination region is easily used for recognition according to a change in the light source environment of the ambient environment.

When the headlight light distribution pattern of the subject vehicle is unknown or different from a light distribution pattern at the time of purchasing the vehicle due to an expired state of the headlight or replacement of the headlight, there is a possibility that the exposure frame cannot be suitably set even if the information of the light distribution pattern setting unit 210 is used. The exposure-frame-on-image setting unit 230 may have a function of roughly estimating the light distribution pattern of the subject vehicle and setting the exposure frame to be prepared for the case where the light distribution pattern is unknown in this manner or the case where the estimated light distribution pattern and a light distribution pattern viewed from the actual vehicle are greatly different from each other although having the exposure information.

Figure 8A:
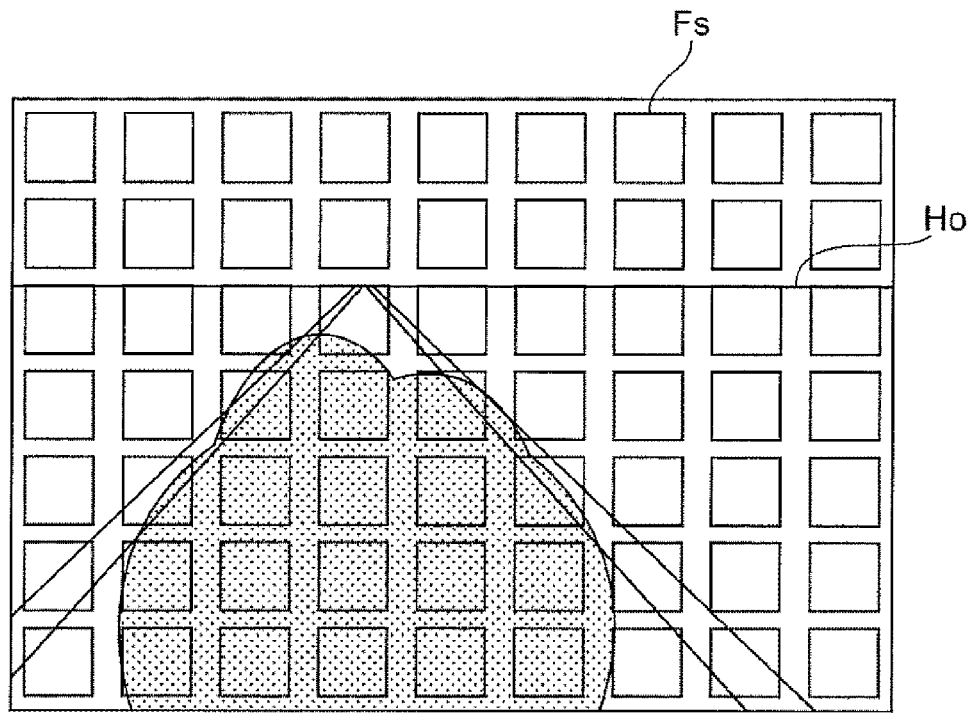
FIGS. 8A and 8B are views for describing a method for estimating the illumination region by an illumination region estimation unit.
Figure 8B:
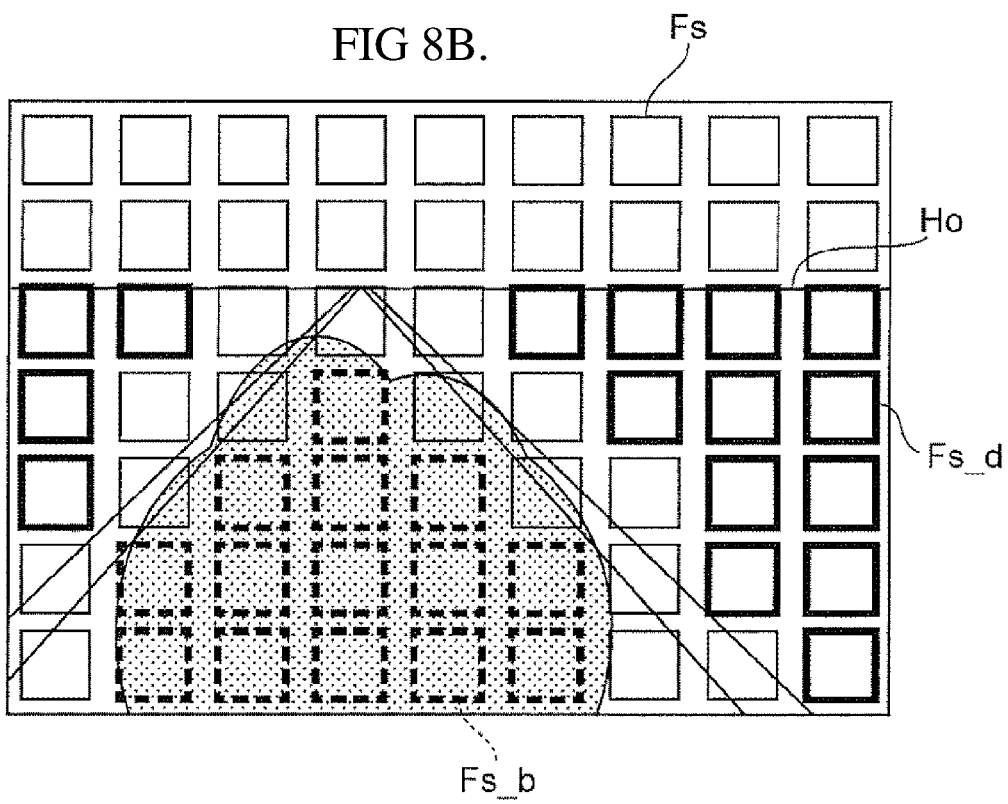

FIGS. 8A and 8B are views for describing a method for estimating the illumination region by the illumination region estimation unit. As illustrated in FIGS. 8A and 8B, a plurality of local exposure frames Fs to observe luminance of each rectangle are arranged side by side on imaging elements in order to estimate the illumination region. The luminance in the arranged local exposure frame Fs is observed, and a result of estimating the posture of the subject vehicle is used so as to roughly use a boundary position Ho between the road surface and the sky. When a change in each of luminance values of the local exposure frames Fs is analyzed in a time-series manner, it is determined that a bright region with little change, and particularly a bright region that is unlikely to be changed even in the middle of curving is a region inside the headlight illumination range (in-illumination region) irradiated by the headlight of the subject vehicle. Then, it is determined that a region where the luminance is changed by a light source of the external environment or the luminance is constantly dark is a region outside the headlight illumination range (out-of-illumination region). In this manner, the region within the headlight illumination range and the region outside the headlight illumination range may be roughly set.

The light source environment recognition unit 240 performs determination on whether the external environment is the day or night, calculation on a light source position such as a tunnel, backlight, and a headlight of an oncoming vehicle. Position information and time from a navigator may be used, and the determination on the day or night can be performed based on exposure information of the camera such as a gain and a shutter value. When the imaged image is used, it is possible to extract a high luminance region such as the backlight and the headlight of the oncoming vehicle as a point light source. First, under bright environment such as the day, sunlight is the main light source for the brightness on the road surface or the like so that a change in brightness caused by the headlight has little influence even if the headlight is in a turned-on state.

The brightness varies between the in-illumination region and the out-of-illumination region when the highlight is turned on in the case of night or a case where it is relatively dark such as the inside of a tunnel even if it is the day, and thus, to perform suitably exposure adjustment separately between the in-illumination region and the out-of-illumination region greatly affects recognition performance. A wide-angle onboard front camera is assumed in the present embodiment, but it is possible to obtain the similar effect even with the stereo camera. Characteristics in the case where the onboard camera is the stereo camera will be described with the stereo left/right region setting unit 250. A function of the stereo left/right region setting unit 250 itself is not necessarily required in a case where the onboard camera is not the stereo camera.

When stereo matching is performed using two cameras provided in the stereo camera, it is desirable that the same exposure condition be satisfied in ranges to perform matching between the left and right cameras. Since the inside of a camera viewing angle is substantially equal to a headlight illumination range in a narrow-angle stereo camera having the viewing angle of about 40 degrees in the related art, and thus, it is unnecessary to consider matching between images with different exposure conditions at the time of matching of the stereo camera.

When stereo matching is performed using a wide-angle stereo camera, however, different exposure frames as illustrated in FIG. 6 are set in each of the in-illumination region and the out-of-illumination region, and images with different exposure conditions are acquired in the in-illumination region and the out-of-illumination region and subjected to image processing. Accordingly, the image suitable for the bright environment (for example, an image under an exposure condition, relatively close to the day, that the shutter speed is fast or the gain is low) is acquired in the illumination region, and the image suitable for the dark environment (for example, an image under exposure condition that the shutter speed is slow or the gain is high) is acquired outside the illumination region. Further, the onboard camera that maintains high recognition performance in the in-illumination region and the out-of-illumination region is obtained by utilizing these images for the image recognition.

However, if this process is implemented as it is with the left and right cameras, the matching of left and right images is performed in the images with different exposure conditions so that accuracy in matching deteriorates in the case of performing the stereo matching while searching the inside of the image of the left camera in the horizontal direction using the right camera as a base and a local rectangular region of the right camera as a reference image. In addition, when an exposure condition is simply changed on the same coordinates on images of the left and right cameras, it is difficult to perform suitable matching in a boundary region thereof, and the accuracy in matching deteriorates at the time of utilizing the matching using images with different exposure conditions exceeding the boundary.

Figure 9:
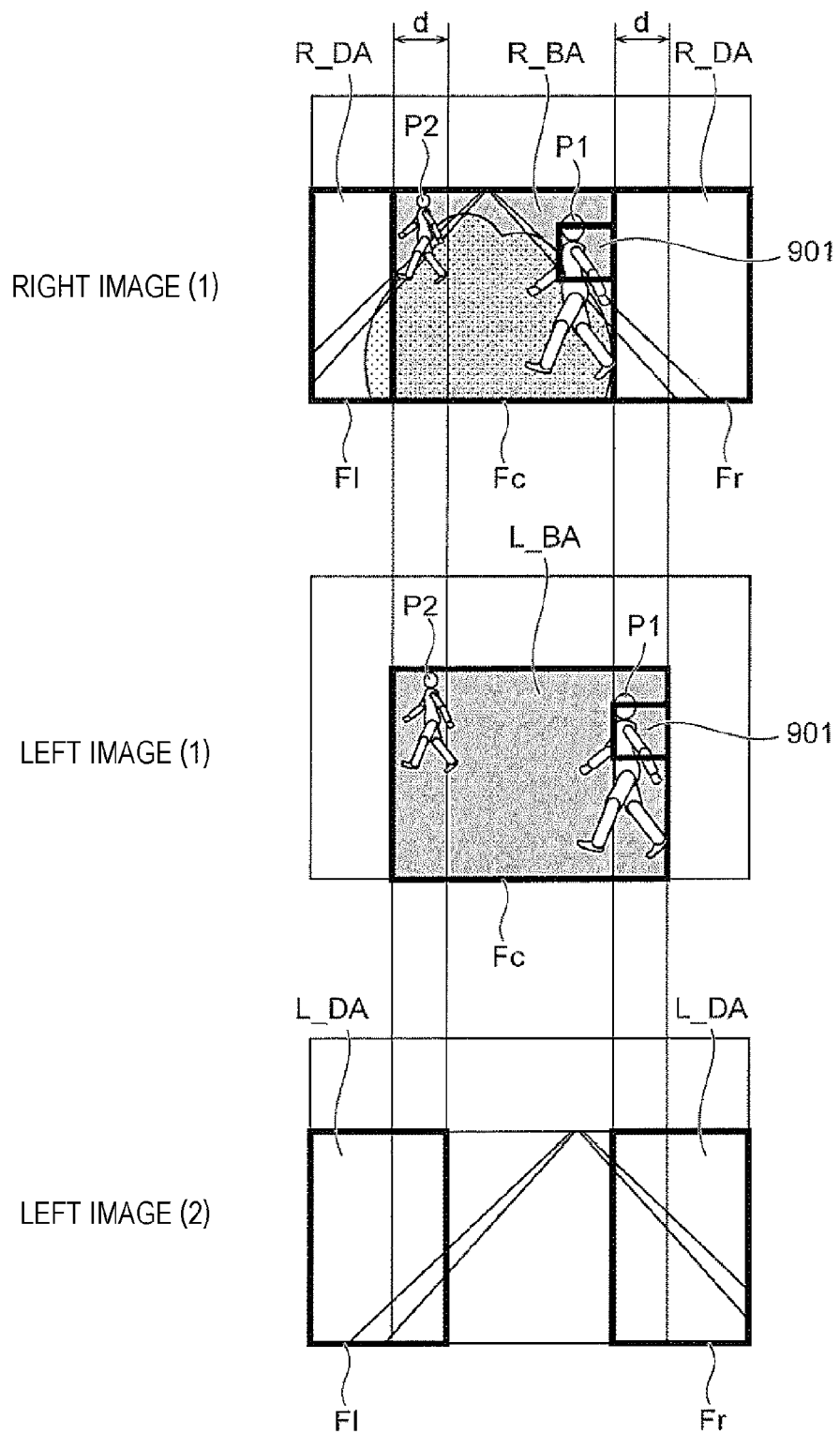
FIG. 9 is a view for describing stereo matching using an image imaged by a wide-angle camera.

FIG. 9 is a view for describing stereo matching using an image imaged by a wide-angle camera. In the present embodiment, the stereo matching is performed using images with the same exposure condition. When a right image (1) imaged by the right camera is defined as a reference image, exposure frames Fc, Fr, and Fl are set using the right image (1) as the reference, and an in-illumination-region image R_BA and an out-of-illumination-region image R_DA are acquired, for example, as illustrated in FIG. 9.

In the case of considering stereo matching of an image inside the illumination region, a distant object is imaged at substantially the same place by the left and right cameras, but a greater disparity is generated, for example, a slightly left side in the right camera and a slightly right side in the left camera, due to the influence of a difference between left and right installation positions of the stereo camera as an object is closer. Therefore, for example, an exposure region of the right image (1) which is the reference image is used as a base, and left images (1) and (2), which are search images, set a region which is larger by a search amount of matching. The same gain is set for the same height region on the left and right images.

In the example of FIG. 9, an in-illumination-region image L_BA, which is wider in the lateral direction by a disparity d to be detected than the in-illumination-region image R_BA of the right image (1), is prepared in advance in the left image (1) in order to allow a local rectangular region 901 installed around the neck of a pedestrian P1 at a close distance to be stereo-matched using images with the same exposure condition. The same process is also performed in the out-of-illumination region, and an out-of-illumination region image L_DA of the left image (2) to be matched prepares out-of-illumination region image L_DA in a range wider in the lateral direction by an effective disparity d, in advance, with respect to the out-of-illumination-region image R_DA of the right image (1). When the images with the exposure condition in consideration of the effective disparity which is likely to occur at the close distance to be detected in the left and right cameras are prepared in advance in this manner, it is possible to suitably perform the stereo matching even in the boundary region where the exposure condition is changed.

The right camera acquires the right image (1) where there is no overlap between boundaries of the exposure conditions, but the left camera acquires the left images (1) and (2) of two or more exposure conditions in which ranges overlap each other in the boundary region in consideration of the stereo matching. Then, left and right images with the same exposure condition are selected for the stereo matching. That is, the in-illumination-region image R_BA in the right image (1) and the in-illumination-region image L_BA in the left image (1) are used for the stereo matching of the in-illumination region, and the out-of-illumination-region image R_DA of the right image (1) and the out-of-illumination-region image L_DA of the left image (2) are used for the stereo matching of the out-of-illumination region.

The in-illumination-region observation unit 300 illustrated in FIG. 1 performs luminance observation in the illumination region such as calculation of the luminance average of the image in the exposure frame Fc as illustrated in FIG. 6. In addition, when the illumination region is not known, an attribute of either the in-illumination region or the out-of-illumination region may be given to each of finely-divided local exposure frames Fs as illustrated in FIGS. 8A and 8B and an average luminance thereof may be calculated using a local exposure frame group Fs_b having the attribute of the in-illumination region.

Similarly to the in-illumination-region observation unit 300, the out-of-illumination-region observation unit 350 performs luminance observation outside the illumination region such as calculation of the luminance average of the image in the exposure frames Fl and Fr as illustrated in FIG. 6. The exposure frames Fl and Fr outside the illumination range exist separately on the left and right, but can be used by being averaged with each other. In addition, when it is desired to perform exposure adjustment in consideration of a headlight of an oncoming vehicle or a vehicle traveling on an adjacent lane, or the like, it is possible to perform the exposure adjustment that is more adaptable to the ambient light source environment in the case of performing the exposure observation separately on the left and right and performing even the exposure adjustment separately on the left and right. In addition, when the illumination region is not known, an attribute of either the in-illumination range or the out-of-illumination range may be given to each of finely-divided local exposure frames Fs as illustrated in FIG. 8 and an average luminance thereof may be calculated using a local exposure frame group Fs d having the attribute of the out-of-illumination region. Similarly, a local exposure frame group may be divided into left and right parts separately on the left and right sides using a region inside the illumination range hit by the headlight of the subject vehicle as the center.

Next, a detailed configuration of the in-illumination/out-of-illumination exposure adjustment unit 400 will be described.

Figure 3:
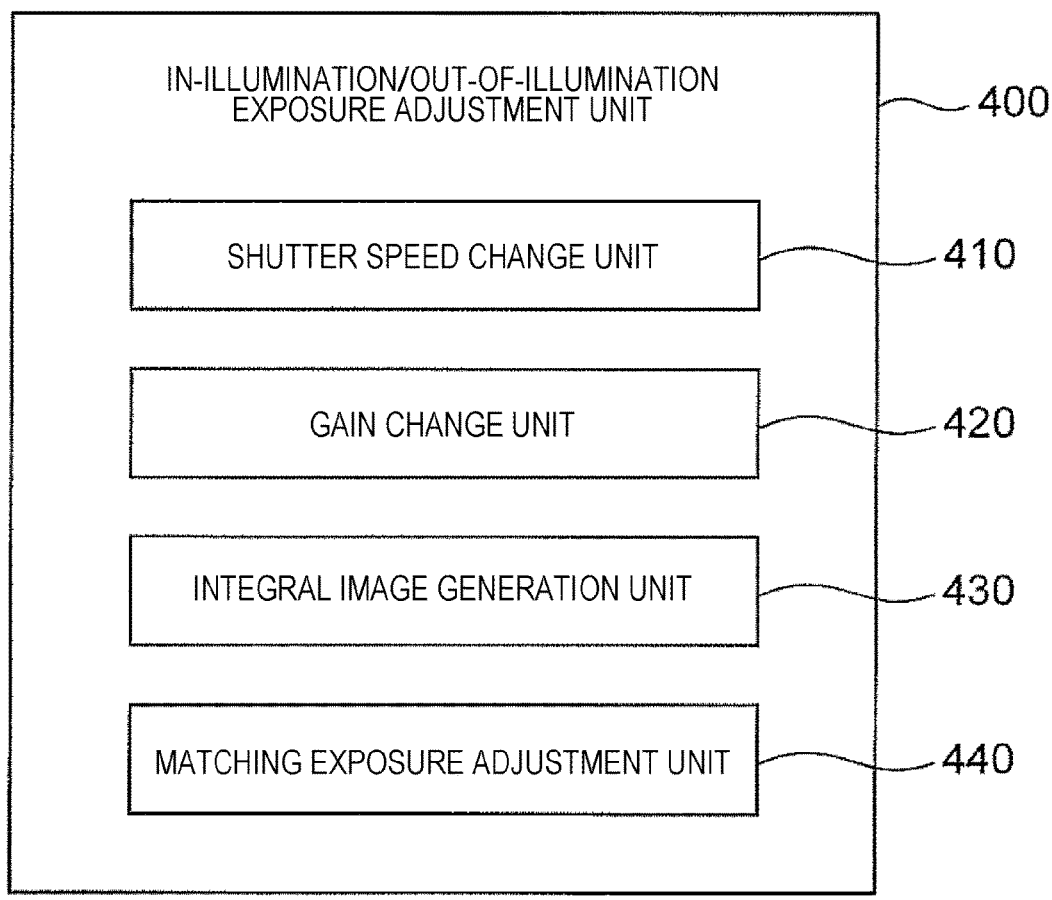
FIG. 3 is a diagram illustrating a configuration of an in-illumination/out-of-illumination exposure adjustment unit.

FIG. 3 is a diagram for describing the configuration of the in-illumination/out-of-illumination exposure adjustment unit. It is possible to observe a state of the imaged image by observing the luminance of the exposure frame set by the illumination region setting unit 200 using the in-illumination-region observation unit 300 and the out-of-illumination-region observation unit 350. Utilizing this luminance information, the exposure adjustment so as to prevent the over exposure is performed when the average luminance inside the exposure frame Fc is high such that the average luminance does not exceed a certain fixed value, and conversely, the exposure adjustment so as to prevent the under exposure is performed when each average luminance inside the exposure frames Fl and Fr is low.

Since there are a plurality of implementation methods for performing the exposure adjustment, several types of implementation methods will be described here. The actual exposure adjustment may be performed by a method using any one of the methods, or using a plurality of the methods in a simultaneous or switched manner.

The shutter speed change unit 410 increases the shutter speed to perform the adjustment such the average luminance decreases when the average luminance is likely to exceed a certain threshold based on each average luminance of the exposure frames Fc, Fl, and Fr observed by the in-illumination-region observation unit 300 or the out-of-illumination-region observation unit 350, and performs the adjustment of the shutter speed such that an observation region in the acquired image is not subjected to the over exposure. On the contrary, when the average luminance is low, the feedback control may be performed such that the imaged image becomes bright by increasing the shutter speed.

Since the headlight of the vehicle is the main light source in the nighttime, it is assumed that the exposure condition within the headlight illumination range does not significantly change, and a degree of change in the exposure condition during one frm is set to be small as the gentle feedback control. Then, a quick change in light source environment caused by the headlight of the oncoming vehicle or the like is also assumed as the exposure condition outside the headlight illumination range in the nighttime, and thus, a degree of change in the exposure condition is larger than that within the illumination range. A bright image may be imaged outside the headlight illumination range in the nighttime in combination with gain adjustment when it is likely to be difficult to acquire a bright image even if the shutter speed is increased to the limit. In addition, images for the in-headlight illumination range and the out-of-headlight illumination range may be captured simultaneously for each region or may be captured at different consecutive shutter timings by acquiring an image to capture the image of the in-illumination range first, and then, an image to capture the image of the out-of-illumination range.

The gain changing unit 420 can also change the gain by software after the imaging, and easily changes a gain table relatively freely according to the region on the image, which is different from the shutter speed. Here, images are acquired using different gain tables between the in-illumination range and the out-of-illumination range. It is important that a region to be searched by stereo matching has the same exposure condition in the case of the stereo camera, but such a restriction condition is not applied in the case of the monocular camera so that it is possible to freely change the gain. Thus, the gain adjustment is performed such that luminance of an image before being subjected to the gain adjustment becomes luminance of an image acquired under the same illumination environment such as the daytime by utilizing the average luminance for each local region of the local region exposure frame Fs inside and outside the illumination region of FIG. 8. Accordingly, the bight image is acquired such that it is possible to detect the obstacle with the same performance as in the daytime even in the out-of-headlight illumination range in the nighttime, and the recognition process such as the obstacle detection is implemented.

In the case of the stereo camera, it is difficult to maintain the same exposure condition in a search range for stereo matching if a gain table that varies depending on a position on the image is used. As illustrated in FIG. 10, the luminance of the image is adjusted using different gain tables between a high luminance exposure region inside the headlight illumination range and a high luminance exposure region outside the headlight illumination range as one setting condition of the stereo camera similarly to the exposure condition.

The right camera serving as the reference image of the stereo camera is used as a reference to prepare an image of the left camera obtained by widening an image width by the disparity as a search range of stereo matching of the left camera. Accordingly, the stereo matching enables acquisition of the image in which the same exposure condition is guaranteed, and it is possible to acquire more accurate disparity images inside and outside the illumination range.

In the case of the stereo camera, a more accurate disparity image may be used by acquiring two pairs of left and right images for the in-illumination/out-of-illumination ranges, acquiring each disparity image thereof, and adaptively selecting any one of the two acquired disparity images for the in-illumination/out-of-illumination ranges to be used according to a position on the image based on the exposure patterns of the in-illumination/out-of-illumination ranges as illustrated in FIG. 7.

It is possible to remove noise and acquire an image with less noise by integrating a plurality of images in the integral image Generation unit 430, which is one of techniques suitable particularly for acquisition of the image outside the headlight illumination range in the nighttime. Meanwhile, there is a risk that the integration time is too long so that a moving object may be captured to be shaken unless the onboard camera is a camera that enables imaging with high-speed shutter to some extent. For this reason, a camera, capable of imaging a lot of images of 60 frm or more to some extent at a fixed time, is more suitable for the obstacle recognition.

Here, the images captured at high speed are integrated in the case of the camera capable of wide-angle and high-speed imaging, and a dynamic range of a darker region is retained and used for image recognition in addition to the shutter time and the gain. When the plurality of images are averaged, the noise is reduced, and a difference in luminance that is originally present can be clearly acquired. Thus, it is possible to acquire an image that can be used for recognition by taking the integration or averaging even in an image of a region that is dark and hardly visible. On the contrary, an image of a bright region may be directly used since the bright region is originally imaged with high-speed shutter. Alternatively, the imaging may be performed by further narrowing a shutter, or the gain may be adjusted.

Assuming that the stereo matching is performed, the exposure adjustment and the retention of the image are performed in the matching exposure adjustment unit 440 such that the image with the same exposure condition can be guaranteed in the search region of the stereo matching of the left and right camera images. A simple example will be described with reference to FIGS. 9 and 10.

FIG. 10 is a view for describing the stereo left/right region setting unit. In the stereo matching, the in-illumination region and the out-of-illumination region are set using an image of any one of the left and right cameras of the stereo camera as the base, and horizontal search is performed while calculating a correlation with a local rectangular region of an image of the other camera using a local rectangular region of the image of the one camera as a reference image. When the right image is used as the reference image as in the present embodiment, a local region of the left camera similar to a local region of the right camera is searched. In this case, a difference in position reflected on the image more easily occurs in some of subjects imaged by the right if being at a close distance. This becomes a disparity between the left and right cameras, and the larger disparity represents the closer distance. As the distance is far, the disparity decreases and the same object is imaged at substantially the same position on the images of the left and right cameras.

Based on the principle of triangulation, it is represented that an object is at a closer distance with a larger disparity, and an object is at a farther distance with a smaller disparity. In such a case, the local region of the right reference image is searched while matching a position where the same landscape appears on the image from the same position with the same vertical height of the left camera to the right side in the stereo camera having completed Geometric calibration of the left and right cameras. Accordingly, a similar local region is searched, and a found position is used as a disparity retained in the region. In such a case, it is an indispensable condition to prepare an image obtained by widening the reference image by a search range for the range part to search the disparity of the left and right cameras. In the present embodiment, a size of the imaging region for matching is changed between the left and right cameras.

In the case of a high luminance exposure region as illustrated in FIG. 10, for example, a left image (1) as the search image is acquired so as to be larger than a right image (1) which is the reference image by a search ranged in a search direction. Similarly, a left image (2) as the search image is acquired so as to be larger than a right image (2) which is the reference image by the search range d in the search direction in the case of a low luminance exposure region.

FIG. 11 is a view for describing the stereo left/right region setting unit for each imaging height. As illustrated in FIG. 11, the stereo left/right region setting unit 250 may also be configured to change the gain and shutter condition even in the vertical direction. Since the matching process is performed in the left-right direction in the stereo matching, the change of the exposure condition (the gain, the shutter, the integration with the high-speed camera, or the like) in the vertical direction does not become a factor that causes deterioration in performance of matching that performs the horizontal search. Rather, it is possible to perform setting for a suitable exposure condition that is changed depending on a region with finer conditions as illustrated in FIG. 11.

In the case of the example illustrated in FIG. 11, in-illumination-region images R_BA1 and L_BA1, which are distant from the subject vehicle although being inside the illumination region, become darker than in-illumination-region images R_BA4, L_BA4, R_BA3, and L_BA3 in the vicinity of the subject vehicle because the intensity of light emitted by the headlight decreases in the in-illumination-region images R_BA1 and L_BA1. Thus, it is possible to perform the stereo matching using the more suitable images by acquiring the image under the suitable exposure condition according to the luminance on the image and to find the obstacle and the lane.

In addition, in the out-of-headlight illumination range, a suitable image is generated to generate a disparity image for easier obstacle recognition by performing image recognition by applying different exposure conditions in the respective regions such as out-of-illumination-region images R_DA1, R_DA2, R_DA3, and R_DA4, in the same manner even when the brightness differs for each region due to the influence of light source environment around the subject vehicle.

In addition, a technique of directly using the reference images of these images for the image recognition becomes suitable when it is better if an object is more accurately visible although being partially visible, for example, in lane recognition to recognize the lane WL. In addition, it is possible to maintain the recognition performance without being affected by ambient brightness by performing the image recognition using edges or the like generated from the images with different exposure conditions for each region as described above in the case of obstacle detection or the detection of the pedestrian or vehicle.

In this case, however, the processing is performed with the premise that edges are not generated due to a luminance difference or the like that is likely to occur at a boundary of the illumination region. In addition, in the case of an image recognition technique using smooth change of luminance, such a technique may be sometimes unsuitable to generate a luminance difference for each region. In this case, an image for pattern matching may be prepared using a technique of changing a gain table for the pattern matching other than the stereo matching that causes smooth luminance change in an image according to a position on the image.

Figure 4:
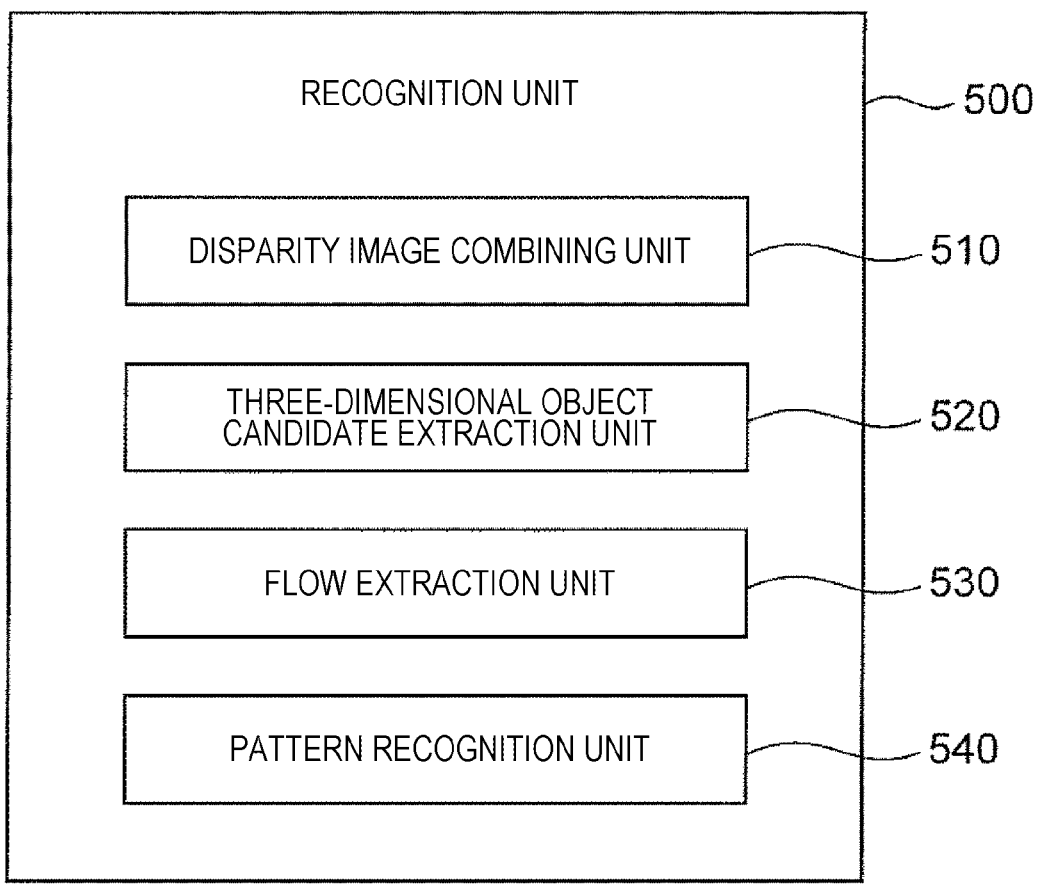
FIG. 4 is a diagram illustrating a configuration of a recognition unit.

Next, a configuration of the recognition unit 500 will be described in detail with reference to FIG. 4. FIG. 4 is a diagram illustrating the configuration of the recognition unit. The disparity image combining unit 510 is unnecessary if the onboard camera is a monocular camera, but is an indispensable element in the stereo camera. First, when a disparity is obtained only by matching of the images with one type of exposure condition at the image position of the reference image, a disparity image thereof is simply used as illustrated in FIG. 9.

When a pair of left and right images with two or three or more exposure conditions is present in the boundary region or the entire image, it is determined that any parity image created under which exposure condition is to be used, that is, which exposure condition is to be used to generate the disparity image in order to enable acquisition of more suitable disparity information by utilizing the light distribution pattern as illustrated in FIG. or the illumination region estimated by the illumination region estimation unit as illustrated in FIG. 8.

In addition, edge information of an actual image as well as the light distribution pattern and the result of the illumination region estimation unit may be utilized as one of a method of determining any exposure condition that enables generation of the more suitable disparity image. At the time of stereo matching, edge information is often insufficient in an image with an unsuitable exposure condition. Meanwhile, any disparity information to be used may be determined based on the light distribution pattern or the illumination region estimation result, and edge intensity information within a local region measured at the time of stereo matching since it is also possible to assume the environment where edge information is originally scarce such as a road surface.

In this manner, it is possible to acquire the suitable disparity information by setting the same exposure condition for the left and right regions to be subjected to the stereo matching. Further, when images are acquired under a plurality of exposure conditions in the case of obtaining disparity information within the same viewing angle (same place), any image under which exposure condition is to be used with priority in stereo matching in order to enable calculation of the accurate disparity is selected by utilizing one or more from among the light distribution pattern, the illumination region estimation pattern, and the edge information. When the suitable disparity information is selected in this manner, it is possible to perform robust obstacle detection and to acquire more accurate distance information.

The three-dimensional object candidate extraction unit 520 extracts a candidate of a three-dimensional object based on the disparity image generated by the disparity image combining unit 510. First, the case where the onboard camera is the stereo camera will be exemplified. Disparity information of a road surface region calculated by the subject vehicle posture measurement unit 220 is deleted from the disparity image. Disparity information existing on the road surface or vertically below the road surface is deleted considering an error component that varies depending on a distance in a disparity value that can be acquired if the road surface is reflected on the screen based on a position and a posture of the camera installed in the subject vehicle.

An effective disparity frequency histogram for each disparity value in the vertical direction with a width of four pixels on an image is calculated using the image from which the disparity information below the road surface is deleted, and this is arranged in the X direction to generate a vdisparity image that represents the disparity value (distance value) in the vertical direction and a horizontal position on the image in the horizontal direction. When a three-dimensional object is present on the road surface, disparities from a vertical edge to the three-dimensional object are arranged in the vertical direction on the disparity image. Thus, a mountain with disparity values (distance values) in which the three-dimensional object exists and a high frequency in the image lateral direction in which the three-dimensional object exists appears on the vdisparity image. Candidates of the three-dimensional object are extracted by searching such a mountain on the vdisparity image. Next, the candidates of the three-dimensional object extracted every frame are observed in a time-series manner, and a final three-dimensional object candidate is set after confirming that the three-dimensional object candidate can be stably tracked.

The extraction of the candidate of the three-dimensional object is performed in the three-dimensional object candidate extraction unit 520. First, an example of the case where the onboard camera is a monocular camera will be described here. In the monocular cameras, information of the subject vehicle posture measurement unit 220 is also used to search edge information extending vertically upward of a three-dimensional object, thereby searching the three-dimensional object candidate. Meanwhile, it is difficult to know whether or not an object is the three-dimensional object in the monocular camera so that a candidate to perform pattern matching is searched. At this time, candidate objects are narrowed down with a rough value of a size of the extracted candidate object by utilizing camera geometry from a posture state of the subject vehicle. Further, a final three-dimensional object candidate to be subjected to pattern matching processing is set with the possibility of tracking to some extent in a time-series manner.

The flow extraction unit 530 often uses a monocular camera, but may use either the monocular camera or a single eye of a stereo camera. The flow extraction unit 530 can extract a moving object by observing motion on an image after capturing motion of an object on images changed in a time-series manner and canceling motion of the background estimated from the behavior of the subject vehicle.

Motion of the background such as a road surface caused by motion of the subject vehicle is estimated, and the motion of the background on the image is estimated using the posture of the camera estimated by the subject vehicle posture measurement unit 220. The motion of the background on the image is estimated, and a flow aggregate taking motion in the same direction and the same size on the image is captured and extracted as a candidate object of the moving object. In addition, it is possible to extract a movement amount of the moving object on the image by obtaining an average of flow of the extracted moving object. Movement speed of the moving object may be calculated using the movement amount on the image. In addition, the above-described processing is continued in a time-series manner, and only an object that can be stably tracked is extracted as a final candidate of the moving object.

Next, the pattern recognition unit 540 performs pattern matching on the three-dimensional object candidate extracted from the three-dimensional object candidate extraction unit 520, or the moving object candidate extracted from the flow extraction unit 530, or the candidate objects extracted from both the units so as to specify any type of the three-dimensional object. The pattern recognition unit 540 performs the pattern matching of a vehicle, a person, and the like. In the case of the vehicle, the pattern recognition unit 540 performs estimation on whether or not the vehicle is a preceding vehicle of the subject vehicle and which degree of speed or any difference in speed with which the vehicle is moving. Even in the case of the person, a position and moving speed are estimated in the same manner, and whether or not the subject vehicle collides with the person is determined. In addition, when an object is another three-dimensional object although it is turned out that the object is not the person or the vehicle by pattern matching, there is no doubt that the object is the three-dimensional object although being the three-dimensional object other than the vehicle and pedestrian particularly in the case of the stereo camera, and thus, the object is used as a target for warning and control.

Finally, the warning control unit 600 estimates a position and movement speed with respect to the pedestrian, the vehicle, or the other three-dimensional obstacle observed by the recognition unit 500 described above, and determines whether or not the object is present in a progressing path of the subject vehicle and the possibility of the collision is high. Then, automatic brake of the subject vehicle is executed when the subject vehicle is at a position and distance that is hardly stopped even if the driver steps on the brake or at immediately before such position and distance. Meanwhile, before performing the above-described vehicle control, the warning is issued when the distance is still long or when an obstacle is likely to pass by the side due to a relationship in horizontal position of about 1 m which is extremely close distance although the possibility of the collision with the subject vehicle is low based on a positional relationship between the subject vehicle and the obstacle.

Figure 12:
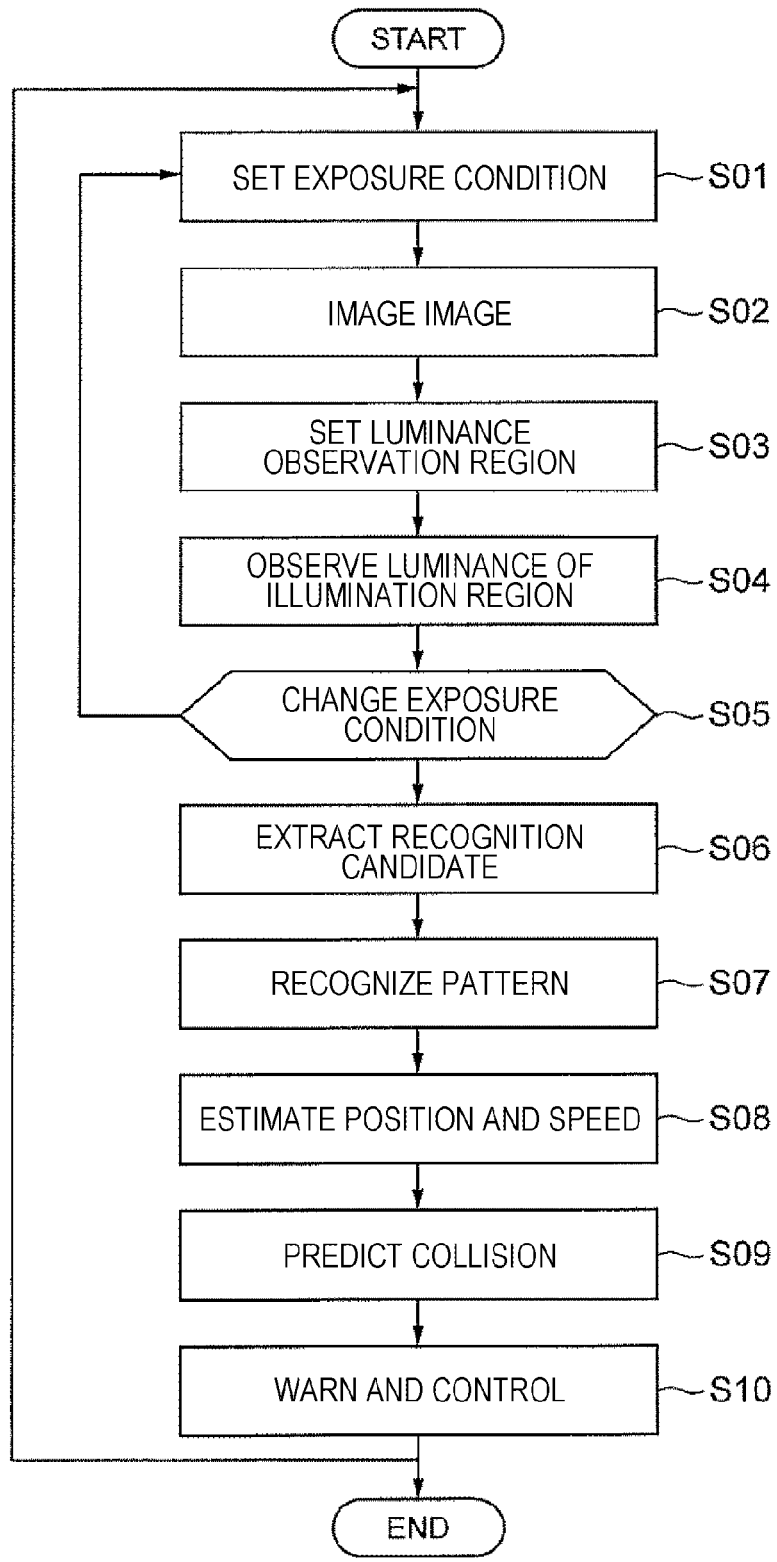
FIG. 12 is a view illustrating a processing flow of single shutter timing.

FIG. 12 is a view illustrating a processing flow of the single shutter timing. First, a single shutter timing processing flow in a case where imaging is performed with a single shutter timing and images with different exposure conditions are acquired in the respective regions will be described here. The description will be given regarding the processing flow in a case where it is possible to perform imaging under the different exposure conditions for the respective regions in terms of hardware such as a CMOS configuration, or a case where the images with the different exposure conditions are acquired by causing the imaging unit to image an intermediate image in consideration of inside and outside of the headlight illumination range and applying a correction gain for each region in terms of software in the post processing.

First, an exposure condition is set (step S01). Only at the time of activation, a default value or an exposure condition at the time of previous end or at the time of power-off may be directly used. Normally, feedback of the exposure condition (the shutter speed or the gain) is performed for each region based on an observation value of an image acquired by processing of a previous frame, and different exposure conditions are set for each imaging region. Alternatively, an exposure condition of intermediate shutter speed and gain in consideration of the inside and outside of the illumination range of the entire image may be set.

Then, an image is imaged (step S02). The image is imaged under the set exposure condition. Then, images are acquired under different exposure conditions for the respective imaging regions. Here, the images with the different exposure conditions may be acquired for the respective imaging regions by perform the imaging under the exposure condition of the intermediate shutter speed and gain and applying different gains for the respective regions by gain change in software processing as the post processing.

Then, a luminance observation region is set (step S03). The luminance observation region is set in each of the in-illumination region and the out-of-illumination region using a light distribution pattern or the estimated illumination region on the image. Next, a luminance average is observed from the luminance observation regions of the in-illumination region and the out-of-illumination region (step S04). Using the luminance average calculated in the above-described process of step S04, feedback control of the exposure condition is performed for each region (step S05).

Next, a recognition candidate such as an obstacle is extracted based on the imaged images (step S06). Extraction of the recognition candidate is performed by the three-dimensional object candidate extraction unit 520 or the flow extraction unit S30. Then, pattern recognition is performed (step S07). In the pattern recognition, pattern matching is performed on the extracted candidate object, and a type of whether the candidate object is a person or a car is set.

Then, movement speed and a position are estimated with respect to the recognized person, car, or other obstacle (step S08), and collision prediction determination is performed (step S09). In the collision prediction determination, a behavior of a subject vehicle is estimated, whether or not the recognized person, car, or other obstacle exists on an estimated path of the subject vehicle or in the vicinity thereof is determined based on the position, and further, whether or not there is a risk of a collision is also determined in consideration of the movement speed.

Further, it is preferable not to execute control for an object, which is more distant than a distance range within which the vehicle may stops when a driver steps on a brake by concerning that there is a possibility that the driver may step on the brake by himself and that it is troublesome if the control is automatically executed or that the driver may excessively rely on the automatic brake. The execution of warning is determined when it is determined that it is too late for the driver to recognize an obstacle and step on the brake, and the execution of the automatic brake is determined only when it is determined that it is further late and the possibility of the collision is high. Then, the warning and control are executed based on a result determined in step S09 (step S10).

FIG. 13 illustrates two processing examples in which time-series processing flows of an imaging timing and a recognition processing timing inside and outside the illumination region in the case of using double exposure are expressed by time charts.

A) Alternate Processing Example: Double exposure processing is one embodiment in the case of performing imaging with different exposure conditions at different timings such as a case where imaging is performed with an exposure condition of the out-of-illumination region in even frames and imaging is performed with an exposure condition of the in-illumination region in odd frames. When it is difficult to set different exposure conditions for each region, the imaging is performed by replacing an exposure condition for each frame. Accordingly, an image under an exposure condition suitable for a bright region inside the illumination region and an image under an exposure condition suitable for a dark region outside the illumination region are alternately imaged as illustrated in the time chart of FIG. 13. Further, at the time of imaging of the out-of-illumination region, an image recognition process inside the illumination region is executed using the imaged image of the in-illumination region, which has been imaged at a previous imaging timing, after the alternately-performed imaging. On the contrary, at the time of imaging of the in-illumination region, an image recognition process is executed using the imaged image of the out-of-illumination region imaged at a previous imaging timing.

B) Unified Processing Example: In a unified processing method of a recognition process using images captured by double exposure, the recognition process is executed for the first time after completion of one set of imaging (imaging for the in-illumination region and imaging for the out-of-illumination region) in the alternately-performed imaging. There may be a case where such a processing procedure is taken particularly when a process of generating one integrated disparity image from images of the in-illumination region and the out-of-illumination region is performed since it is difficult to start the image recognition process unless both the images are prepared. Delay time from the imaging to the recognition is shorter in A) Alternate Processing. B) Unified Processing requires a lot of delay time, but has an advantage that both the images inside and outside the illumination region can be used.

Figure 14:
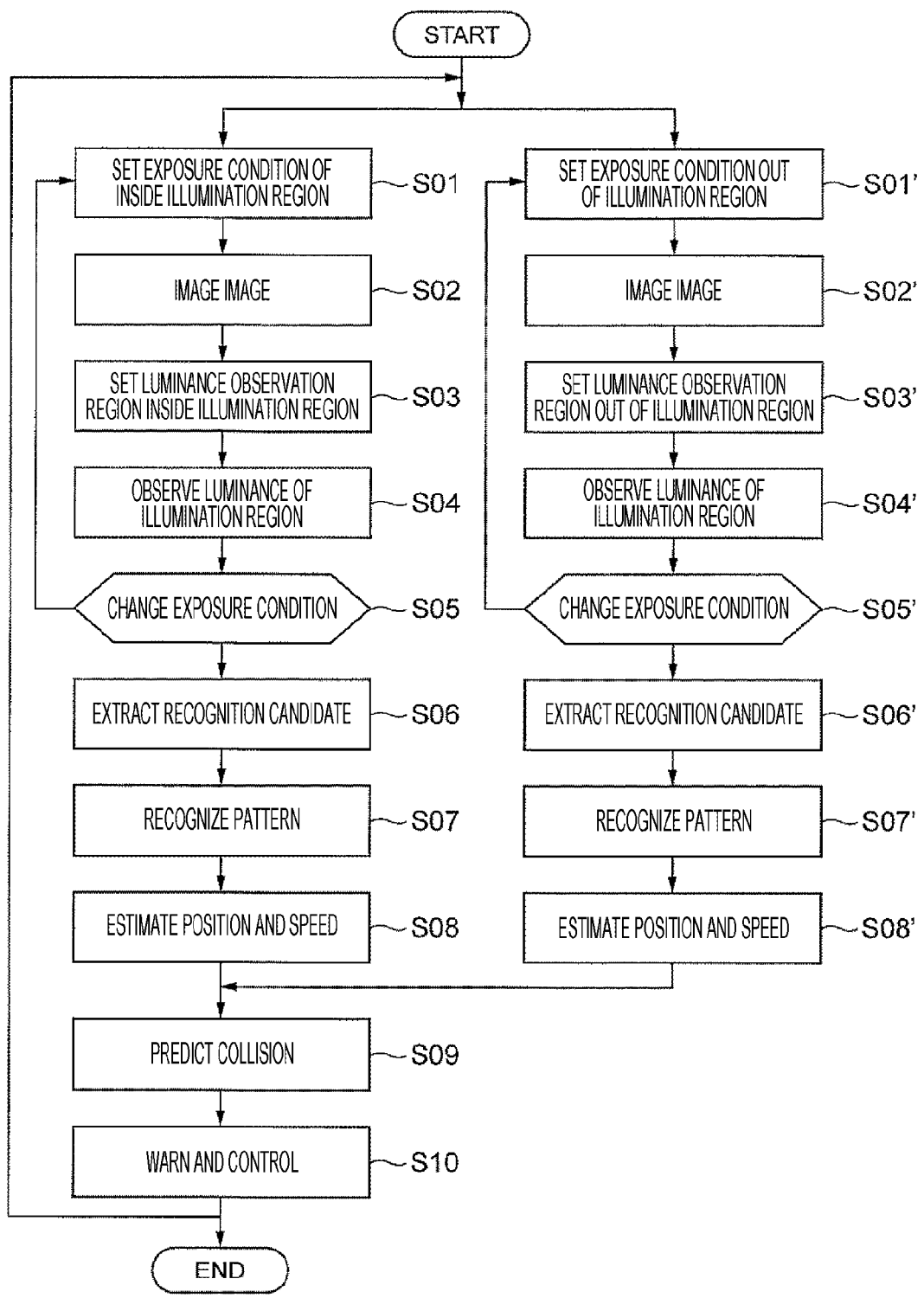
FIG. 14 is a view illustrating a processing flow according to the double exposure.

FIG. 14 illustrates a processing flow of double exposure. In the case of B) Unified Processing of FIG. 13, when one set of images is imaged in a certain period and this period is considered as one processing cycle, a processing flow becomes substantially the same way of thinking as that with the single shutter timing, and thus, will not be described this time. Apart from S01 to S05 is actually processed twice at different timings, and a process of extracting a recognition candidate of S06 is started after preparing two images.

A processing flow in the case of A) Alternate Processing in FIG. 13 will be described with reference to FIG. 14. Since most parts of detail content are common to FIG. 12, only different parts will be mainly described, and the other parts will be briefly described. Steps S01 to S08 in FIG. 14 illustrate an image recognition processing flow in consideration of the in-illumination region. In step S01, an exposure condition of the in-illumination region is set. An image is imaged in step S02, and a luminance observation region of the in-illumination region is set in step S03. Then, an average luminance within the luminance observation region is observed in step S04, and feedback control of setting of the exposure condition is performed using the average luminance observed in step S05. A recognition candidate using the imaged image is extracted in step S06, and identification of a type thereof is performed by pattern matching of a candidate object in step S07. In step S08, a position and moving speed of a person, a vehicle or the like that is likely to be an obstacle are calculated, and the obstacle within the headlight illumination range is detected.

Steps S01' to S08' in FIG. 14 illustrate an image recognition processing flow in consideration of the out-of-illumination region. In step S01', an exposure condition of the out-of-illumination region is set. An image is imaged in step S02', and a luminance observation region of the out-of-illumination region is set in step S03'. Then, an average luminance of the luminance observation region outside the illumination region is observed in step S04', and feedback control of setting of the exposure condition is performed using the average luminance observed in step S05'. A recognition candidate using the imaged image is extracted in step S06', and identification of a type thereof is performed by pattern matching of a candidate object in step S07'. In step S08', a position and moving speed of a person, a vehicle or the like that is likely to be an obstacle are calculated, and the obstacle outside the headlight illumination range is detected.

In step S09, the obstacles within the headlight illumination range and outside the illumination range are detected through these two processing flows. The possibility of a collision is determined based on the position and speed of these obstacles and a behavior of the subject vehicle. In step S10, warning and control are executed based on a result determined in step S09.

A method illustrated in FIG. 15 illustrates an example where two patterns for the region and the out-of-illumination region are alternately captured in the same manner as in A) Alternate Processing Example, and full-screen imaging is performed. This is a method of using an image to be used for image recognition by dividing the in-illumination region and the out-of-illumination region in the same manner as described so far although performing the full-screen imaging due to a restriction condition such as a CMOS to be used as the imaging itself.

In FIG. 15, regions R_BA and L_BA for generation of a disparity image using an image captured with in-illumination exposure are illustrated in the lower part of FIG. 15. These two regions are used to generate the disparity image of the in-illumination region.

On the contrary, the full-screen imaging is performed on an image with an exposure condition adjusted to image a dark region using a shutter in a case where a shutter timing is delayed by one is used with respect to the out-of-illumination region, and two regions R_DA and L_DA outside the illumination region are used to generate a disparity image for the out-of-illumination region. In this manner, suitable images are prepared by taking the images with the different exposure conditions that are captured at different timings within a certain period for the in-illumination region and the out-of-illumination region.

More suitable recognition is implemented for each of the bright region illuminated by the headlight and the dark region that is hardly illuminated by the headlight by recognizing the external environment using the more suitable image for each exposure condition. In particular, a dark region at a wide-angle portion, which has not been taken into consideration in the related art, is more suitably captured, thereby suppressing non-detection and erroneous detection.

In FIG. 15, a boundary between the bright region and the dark region of the right camera is divided without overlapping. After generating the disparity images under the respective exposure conditions, the recognition processing on the entire screen may be performed after combining the disparity images. Alternatively, a method of providing not only a margin for matching of the disparity images between the in-illumination region and the out-of-illumination region but also a margin of a size of an obstacle part at a boundary between the two regions may be used.

The method of matching on the disparity image requires less processing time and is more efficient. However, it is possible to suppress the non-detection since the recognition processing is performed in both the regions in the method of recognizing the image by providing the margins in the in-illumination region and the out-of-illumination region although it takes longer processing time.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion or substitution of other configurations can be made with respect to some configurations of each embodiment.

REFERENCE SIGNS LIST 100 imaging unit
200 illumination region setting unit
210 light distribution pattern setting unit 220 subject vehicle posture measurement unit
230 exposure-frame-on-image setting unit
240 light source environment recognition unit
250 stereo left/right region setting unit
300 in-illumination-region observation unit
350 out-of-illumination-region observation unit
400 in-illumination/out-of-illumination exposure adjustment unit
410 shutter speed change unit
420 gain change unit
430 integral image generation unit
440 matching exposure adjustment unit
500 recognition unit
510 disparity image combining unit
520 three-dimensional object candidate extraction unit
530 flow extraction unit
540 pattern recognition unit
600 warning control unit

The invention claimed is:

1. An onboard environment recognition device comprising:
    an onboard camera that captures an image in front of a subject vehicle, the onboard camera including a first imaging range based on a headlight illumination range of the subject vehicle and a second imaging range wider in a horizontal direction than the headlight illumination range of the subject vehicle, and the captured image being imaged by adjusting brightness between a first image of an in-illumination region obtained by imaging the first imaging range and a second image of an out-of-illumination region obtained by imaging the second imaging range;
    software code stored on a non-transitory computer readable medium, the software code;
    selects exposure conditions and sets the selected exposure conditions at successive shutter timings of the onboard camera to acquire the first image of the in-illumination region,
        wherein the exposure conditions include at least shutter speed and gain,
    uses an image within a headlight light distribution pattern as the first image of the in-illumination region and the image within the headlight light distribution pattern is selected so that when the selected exposure conditions are applied the first image is observed,
    changes exposure conditions of the image within the headlight light distribution pattern to match the selected exposure conditions so a luminance average in the in-illumination region is within a specific range to obtain the first image,
    selects different exposure conditions and sets the selected different exposure conditions at successive shutter timings of one camera to acquire the second image of the out-of-illumination region,
        wherein the different exposure conditions include at least shutter speed and gain,
    uses an image outside the headlight light distribution pattern as the second image of the out-of-illumination region and the image outside the headlight light distribution pattern is selected so that when the selected different exposure conditions are applied the second image is observed, and
    changes exposure conditions of the image outside the headlight light distribution pattern to match the selected different exposure conditions so a luminance average in the out-of-illumination region is within an other specific range to obtain the second image, and
    determines an ambient environment using the captured image from the onboard camera.

2. The onboard environment recognition device according to claim 1, wherein
    the software code sets exposure frames in the in-illumination region and the out-of-illumination region of the captured image, respectively, acquires luminance information in the set exposure frames, and sets the selected exposure conditions which include the adjusted brightness of the in-illumination region and the out-of-illumination region.

3. The onboard environment recognition device according to claim 1, wherein
    the onboard camera is a stereo camera,
    the software code sets the in-illumination region and the out-of-illumination region using an image of a first camera included in the stereo camera, and
    when stereo matching by horizontal search is performed while calculating a correlation with a local rectangular region of an image of a second camera using a local rectangular region of the image of the first camera as a reference image, it is guaranteed that the local rectangular region of the first camera and the horizontally-searched local rectangular region of the second camera are under a same exposure condition,
    wherein the first camera and the second camera are any one of a left camera and a right camera included in the stereo camera as a base.

4. The onboard environment recognition device according to claim 3, wherein
    a plurality of images with two or more exposure conditions are acquired in each of the in-illumination region and the out-of-illumination region by the left camera and right camera,
    a disparity image is generated using images with a same exposure condition,
    disparity information is acquired from images with different exposure conditions at a same location of the captured image are held, and
    the disparity information is prioritized based on at least one of a headlight light distribution pattern and the headlight illumination range.

5. The onboard environment recognition device according to claim 1, wherein
    a plurality of images with two or more exposure conditions in the in-illumination region and the out-of-illumination region are separately imaged at different shutter timings within a certain fixed period.

6. The onboard environment recognition device according to claim 1, wherein
    two or more exposure conditions are applied to each of the in-illumination region and the out-of-illumination region to perform imaging.

7. The onboard environment recognition device according to claim 1, wherein
    the first image and the second image are acquired with respect to the captured image using a gain table.

8. The onboard environment recognition device according to claim 1, wherein
    a group of images captured consecutively are used to integrate a plurality of images and reduce noise in the out-of-illumination region.

* * * * *